(12) United States Patent
Ciecko

(10) Patent No.: US 10,827,353 B1
(45) Date of Patent: Nov. 3, 2020

(54) SYSTEM AND METHOD FOR SEAMLESS ADMISSION TO A VENUE

(71) Applicant: Brendan Ciecko, Boston, MA (US)

(72) Inventor: Brendan Ciecko, Boston, MA (US)

(73) Assignee: Cuseum, Inc., Boston, MA (US)

( * ) Notice: Subject to any disclaimer, the term of this patent is extended or adjusted under 35 U.S.C. 154(b) by 0 days.

(21) Appl. No.: 16/696,226

(22) Filed: Nov. 26, 2019

(51) Int. Cl.
| | | |
|---|---|---|
| *H04W 12/06* | (2009.01) | |
| *H04W 4/12* | (2009.01) | |
| *G06Q 20/32* | (2012.01) | |
| *G06Q 20/40* | (2012.01) | |
| *H04L 29/06* | (2006.01) | |
| *H04L 12/58* | (2006.01) | |
| *H04W 12/08* | (2009.01) | |

(52) U.S. Cl.
CPC ............ *H04W 12/06* (2013.01); *G06Q 20/32* (2013.01); *G06Q 20/40* (2013.01); *H04L 51/38* (2013.01); *H04L 63/08* (2013.01); *H04W 4/12* (2013.01); *H04W 12/08* (2013.01)

(58) Field of Classification Search
CPC ...... G06Q 10/00; G06Q 20/32; G06Q 20/322; G06Q 20/325; G06Q 20/327; G06Q 20/38; G06Q 30/00; G06Q 20/40; G06Q 20/401; G06Q 20/0453; G06Q 20/1235; G06Q 20/18; G06Q 20/3227; G06Q 20/3674; H04W 12/001; H04W 12/00502; H04W 12/00514; H04W 12/0403; H04W 4/02; H04W 4/48; H04W 4/80; H04W 12/06; H04W 4/12
See application file for complete search history.

(56) References Cited

U.S. PATENT DOCUMENTS

| | | | | |
|---|---|---|---|---|
| 9,143,828 | B2* | 9/2015 | Inselberg | H04N 21/44222 |
| 9,407,689 | B1* | 8/2016 | Casares | H04L 67/10 |
| 9,697,650 | B2* | 7/2017 | Nakfoor | G06F 21/33 |
| 2003/0103619 | A1* | 6/2003 | Brown | H04M 3/523 |
| | | | | 379/266.01 |
| 2003/0171960 | A1* | 9/2003 | Skinner | G07B 15/00 |
| | | | | 705/5 |
| 2006/0252602 | A1* | 11/2006 | Brown | G06F 19/3481 |
| | | | | 482/9 |
| 2007/0037574 | A1* | 2/2007 | Libov | H04M 3/42357 |
| | | | | 455/435.2 |
| 2007/0198432 | A1* | 8/2007 | Pitroda | G06Q 20/367 |
| | | | | 705/64 |

(Continued)

*Primary Examiner* — Jean A Gelin
(74) *Attorney, Agent, or Firm* — Robert Schuler

(57) ABSTRACT

An admission system comprising a mobile admission application in communication with a venue admission system. The mobile admission application runs on a mobile communication device under the control of an individual and operates to generate and send an admission request to the venue admission system having the identity of the member. The venue admission system operates to receive the admission request message and to verify the membership of the individual sending the request message. Provided the individual is verified to be a member of the venue, the venue admission system encrypts the member identity and sends the encrypted identity to the mobile admission application. Prior to being admitted to the venue, the mobile admission application generates and send an admission message with the encrypted member identity that is received by the venue admission system.

17 Claims, 8 Drawing Sheets

MEMBER ADMISSION PROCEDURE

(56) References Cited

U.S. PATENT DOCUMENTS

| | | | | |
|---|---|---|---|---|
| 2010/0138037 A1* | 6/2010 | Adelberg | ............ | G06Q 10/087 700/241 |
| 2011/0075612 A1* | 3/2011 | Guo | ........................ | H04L 67/26 370/329 |
| 2012/0284108 A1* | 11/2012 | Fontana | ............. | G06Q 30/0226 705/14.27 |
| 2013/0179201 A1* | 7/2013 | Fuerstenberg | ...... | G06Q 30/0255 705/5 |
| 2015/0066789 A1* | 3/2015 | Keith | .................... | G06Q 50/01 705/319 |
| 2015/0142483 A1* | 5/2015 | Bergdale | ................. | H04W 4/80 705/5 |
| 2015/0180922 A1* | 6/2015 | Draznin | .............. | H04L 65/4076 370/312 |
| 2015/0325058 A1* | 11/2015 | Lambrinos | ............. | G07B 15/04 705/13 |
| 2015/0348027 A1* | 12/2015 | Wei | .................... | G06Q 30/0601 705/44 |
| 2016/0029160 A1* | 1/2016 | Theurer | ................ | G01S 5/0284 455/456.1 |
| 2016/0260031 A1* | 9/2016 | Pace | .................... | G06Q 20/1235 |
| 2018/0018593 A1* | 1/2018 | Benavides | ............ | G06Q 10/02 |
| 2018/0211457 A1* | 7/2018 | Haworth | ................. | G06F 21/35 |
| 2019/0043283 A1* | 2/2019 | Hyde | ...................... | A61B 5/053 |
| 2019/0279199 A1* | 9/2019 | Sheets | ................ | G06Q 20/3227 |
| 2020/0118400 A1* | 4/2020 | Zalewski | ............. | G07G 1/0072 |

\* cited by examiner

MEMBERSHIP REGISTRATION PROCESS 400

MEMBER CARD 460

FIG. 6

MEMBER REFERENCE FILES IN DBASE

| Name | ID /Barcode | Admits | Hash'd ID | UUID/KEY |
|---|---|---|---|---|
| Andy Warhol | 1111111111 | 2 | e11170b8cbd2d7410265 1cb967fa28e5 | e11170b8cbd2d7410265 1cb967fa28e500 |
| Vincent van Gogh | 2222222222 | 1 | 3a08fe7b8c4da6ed09f21c3ef97efce2 | 3a08fe7b8c4da6ed09f21c3ef97efce200 |
| Peggy Guggeheim | 3333333333 | 4 | 4aee3e28df37ea1af64bd636eca59dcb | 4aee3e28df37ea1af64bd636eca59dcb00 |
| Josef Albers | 4444444444 | 2 | e53a68903e2c336a8909071 25b489abd | e53a68903e2c336a8909071 25b489abd00 |
| Frida Kahlo | 5555555555 | 2 | 0b5de470bdace90bd6cfb2541eb79f99 | 0b5de470bdace90bd6cfb2541eb79f9900 |

FIG. 8    BLE PACKET MEMBER DATA FORMAT

BLE packet => hash ID => member ID
UUID = 34 char max.
Major (0 - 64535) + Minor (0 - 64535)
UUID = Hash'd ID + 00

FIG. 9

MEMBER ADMISSION PROCESS 900

MEMBER MOBILE APPL.

MOBILE APPL. INITIATED 910

MEMBER REQUESTS ADMISSION, MEMBER ID SENT TO ADMIT SYSTEM 915

ADMIT KEY RECEIVED AND STORED 940

MEMBER ENTERS VENUE, KEY PLACED INTO BLE PACKET & PERIODICALLY BROADCAST 945

VENUE ADMISSION SYSTEM

MEMBER ID RECEIVED 920

MEMBER ID COMPARED TO MEMBERSHIP FILES & MEMBERSHIP VERIFIED OR NOT 925

IF VERIFIED, ENCRYPT MEMBER ID, SEND ADMIT. KEY TO MEMBER MOBILE 930

VENUE DETECTS & VERIFIES MEMBER KEY, CHECKS MEMBER IN TO VENUE, UPDATES MEMBER FILE & DISPLAYS MEMBER INFO ON RECEPTION SCREEN 950

VENUE SYS DETECTS LOC. OF DEVICE XMITTING PACKET PERIODICALLY BROADCAST, AND STORES LOC. INFO IN MEMBER FILE 955

SYSTEM AND METHOD FOR SEAMLESS ADMISSION TO A VENUE

1. FIELD OF THE INVENTION

The present disclosure relates to the seamless and secure admission of members to a venue.

2. BACKGROUND

Venues that require an admission fee typically collect the fee at an entrance to the venue. Alternatively, an individual may be able to pre-pay an admission fee, and their pre-payment can be confirmed upon entry to the venue by showing proof of pre-paid. Admission confirmation can be accomplished in a number of different ways. For example, admission can be confirmed displaying a physical admission ticket to staff at an admissions desk, or by scanning or in some other manner transferring virtual admission ticket information to an admission system associated with the venue. In the case of the latter, a mobile device storing proof of admission pre-payment can transfer this proof to an admission system by displaying an image of the admission ticket and scanning the image of the ticket into the venue admission system at the venue entrance or in some other manner transferred pre-paid admission information to the venue admission system.

Another means by which admission pre-payment can be confirmed is with the use of personal biometric information, such as the recognition of facial features or other biometric information associated with a particular person. Facial feature information can be transferred to or maintained by a venue prior to or during the admission pre-payment process. Then, when this person enters the venue, their biometric features can be scanned and compared for a match to biometric information maintained by the venue.

Regardless, of the manner in which the admission fee is confirmed, and regardless of whether an individual is a member of a venue or not, it can be necessary for an individual to wait in a queue at the venue entrance or admission desk for their payment to be collected or their pre-payment to be confirmed prior to gaining entrance to the venue.

3. BRIEF DESCRIPTION OF THE DRAWINGS

FIG. 6 is a diagram illustrating a format in which membership information can be maintained in member files.

illustrates steps performed by the mobile admission application 105 and the venue admission system 500 to admit a member to the venue.

FIG. 8 is a diagram illustrating a format that can be used to transfer an encrypted membership identity from the venue admission system to the mobile admission application.

FIG. 9 is a diagram illustration the member admission process.

4. DETAILED DESCRIPTION

The current procedures for gaining admission to a venue by either paying an admission fee upon entry to the venue or by pre-paying the admission fee, and then having admission verified at some later date can take time. Time can be spent waiting in a queue at the venue admission desk to pay the admission fee, or waiting in an admission desk queue for verification of a pre-paid admission fee or waiting to show proof of membership. And while this time spent waiting for admission to a venue can be mitigated by the use of a biometric admission verification system, such systems can be considered an unwanted intrusion into an individual's right to privacy.

In light of the above time and privacy issues associated with a venue admission process, I have designed a system that provides for both a secure venue admission procedure and an admission procedure which mitigates or eliminates time spent waiting in a queue for admission to a venue. Using my admission system, there is no need for an individual who has been granted membership in a venue to wait in a queue to scan admission information into a venue admission system, or to wait in a queue to pay an admission fee to venue admission staff, or to wait for venue admission staff to verify admission information in the venue admission system. My admission system operates to support an admission procedure which is seamless, self-serviceable, and which saves time for both the visiting member and for venue staff. Further my system can operate to track the movement of a member in the venue, and this movement can be used by the venue for marketing or other promotional activities.

Figure 1:
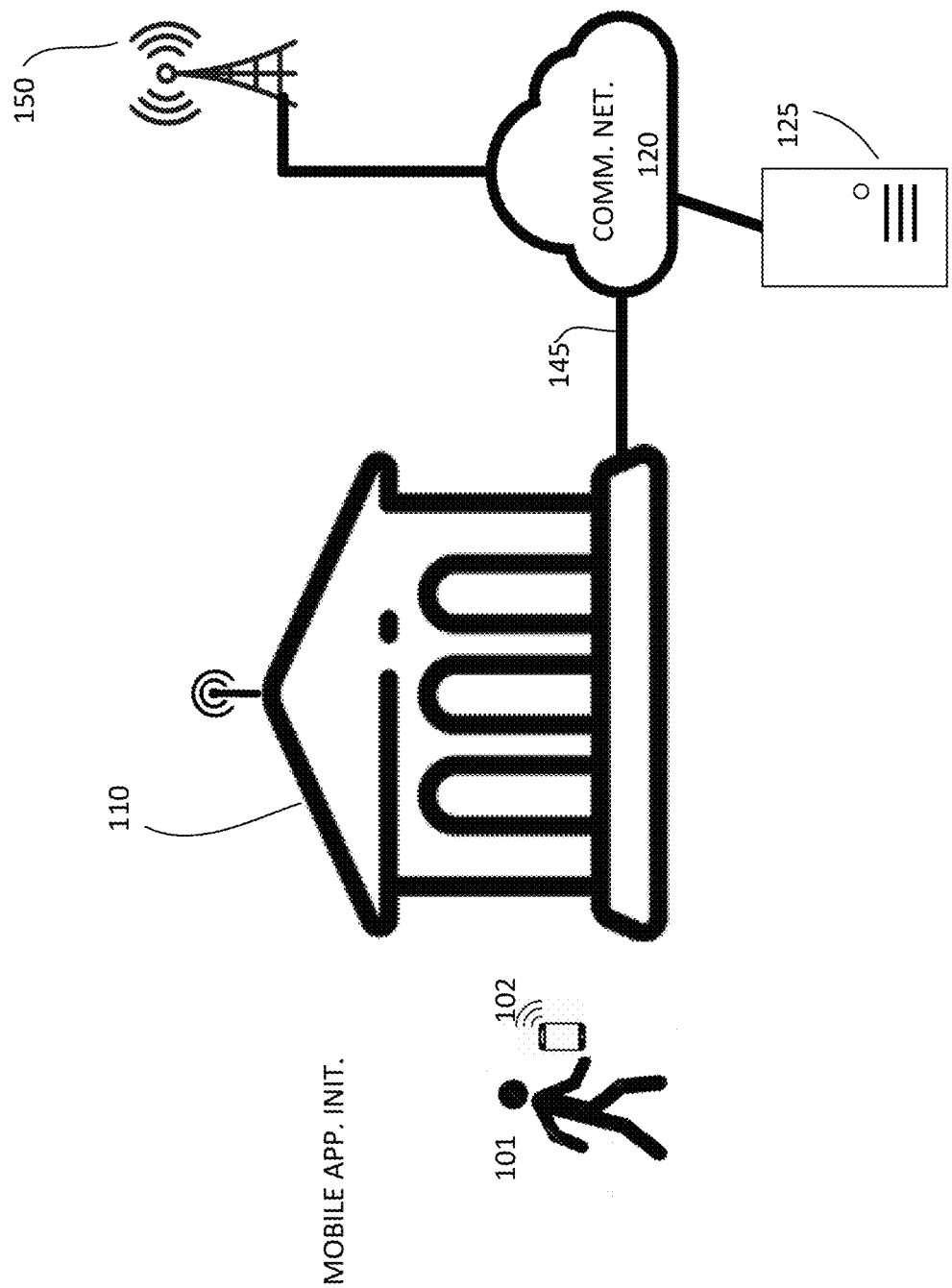
FIG. 1 is a high-level diagram of a venue admission system showing an individual 101 initiating a mobile admission application running on a mobile device 102 prior to entering the venue.

These and other advantages of my admission system will now be described with reference to the Figures, in which FIG. 1 shows operational components comprising a member admission system 100. An individual member 101 is shown carrying a mobile device 102 supporting the operation of a mobile admission application. The mobile device 102 can be any communication device that can be easily carried, worn or in some other manner associated with an individual. The mobile admission application can operate to wirelessly transmit and to receive membership information to a venue admission system 125 that can include, among other things, the identity of venue members. The venue admission system 125 is comprised of one or more computational devices and associated storage for membership information. FIG. 1 also shows a venue 110 connected to a communication network 120 over a wired communication line 145 to the venue admission system 125. The communication network 120 can be configured to transmit information to and from the venue 110 over the wired line 145 or over a wireless infrastructure 150. While the venue admission system 125 is shown to be located remotely from the venue 110, this does not necessarily have to be the case, as it can also be located on the premises of the venue.

Continuing to refer to FIG. 1, the venue admission system 125 generally operates to receive, among other things, member identity information transmitted by the mobile admission application in an admission request message. The venue admission system 125 can examine membership files maintained in the store 140 for a member identity matching the received member identity. If the system 125 determines that there is a match between the received member identity information and member identity information maintained in any one of a plurality of membership files in the store 140, then the system 125 can encrypt the matching member identity information and transmit this encrypted information (i.e., encryption key) to the mobile admission application running on the mobile device 102. All of the above can be completed prior to or coincident with the member 101 entering the venue 110. While the admission request message described above has the identity of a member, it can have other member information exclusive or inclusive of the member ID.

Figure 2:
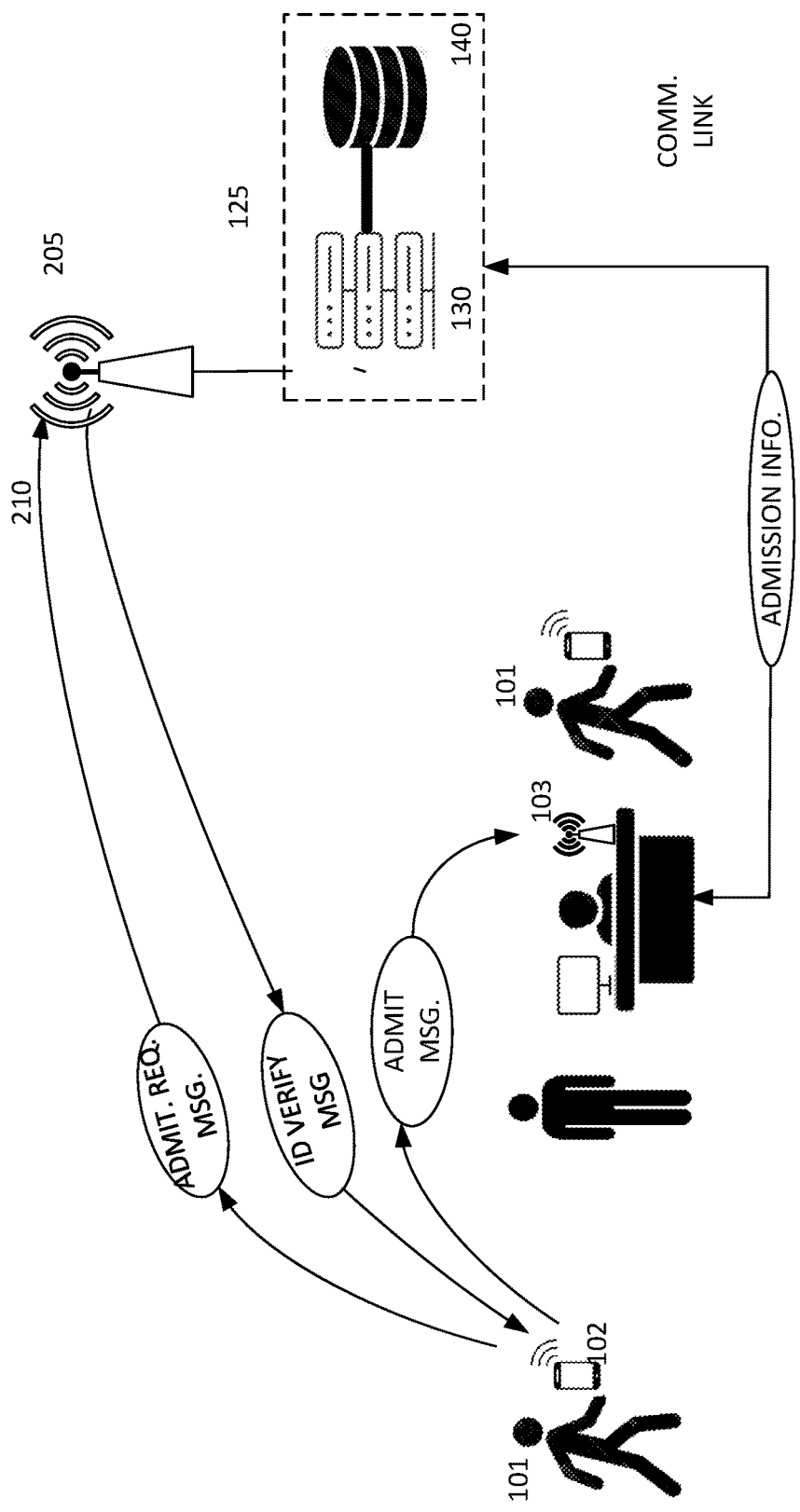
FIG. 2 is a diagram illustrating the transmission of admission information between the mobile device 102 running the admission application and the venue admission system.

FIG. 2 generally illustrates how the member 101 can use the mobile admission application to verify their membership status and gain admission to the venue 110. At some point in time prior to being admitted to the venue 110, the member 101 can initiate the mobile admission application which can operate to wirelessly transmit to the venue admission system 125 an admission request message having the member identity information stored on the mobile device 102. If the member identity information in the request message is verified by the admission system 125, the admission system encrypts the member identity and includes it in a membership verification message that is transmitted wirelessly to the members mobile device 102, where is can be stored for later use. Subsequently, the mobile admission application can enter the encrypted member identity into an admission message that can be periodically broadcast. Subsequently, at some point in time, the mobile device 102 moves with the member 101 to be within range of a venue wireless access point 103, at which time a periodically broadcast admission message is received by the admission system 125 and entrance into the venue and payment of an admission fee by the member can be confirmed. Once admitted to the venue, the member information can be displayed, as necessary, on a screen at an admission desk for viewing by venue staff. The admission system 125 operating in this manner allows the venue to immediately know that a member has been admitted, and affords the venue staff the opportunity to view and update the member information and to address the member with a personal greeting as they approach the admission desk. Further, and in the case that the member does not have any business to attend to at the admission desk, an admission system operating in this manner allows the member to move in a rapid and uninterrupted manner past the admission desk and into the venue.

Figure 3:
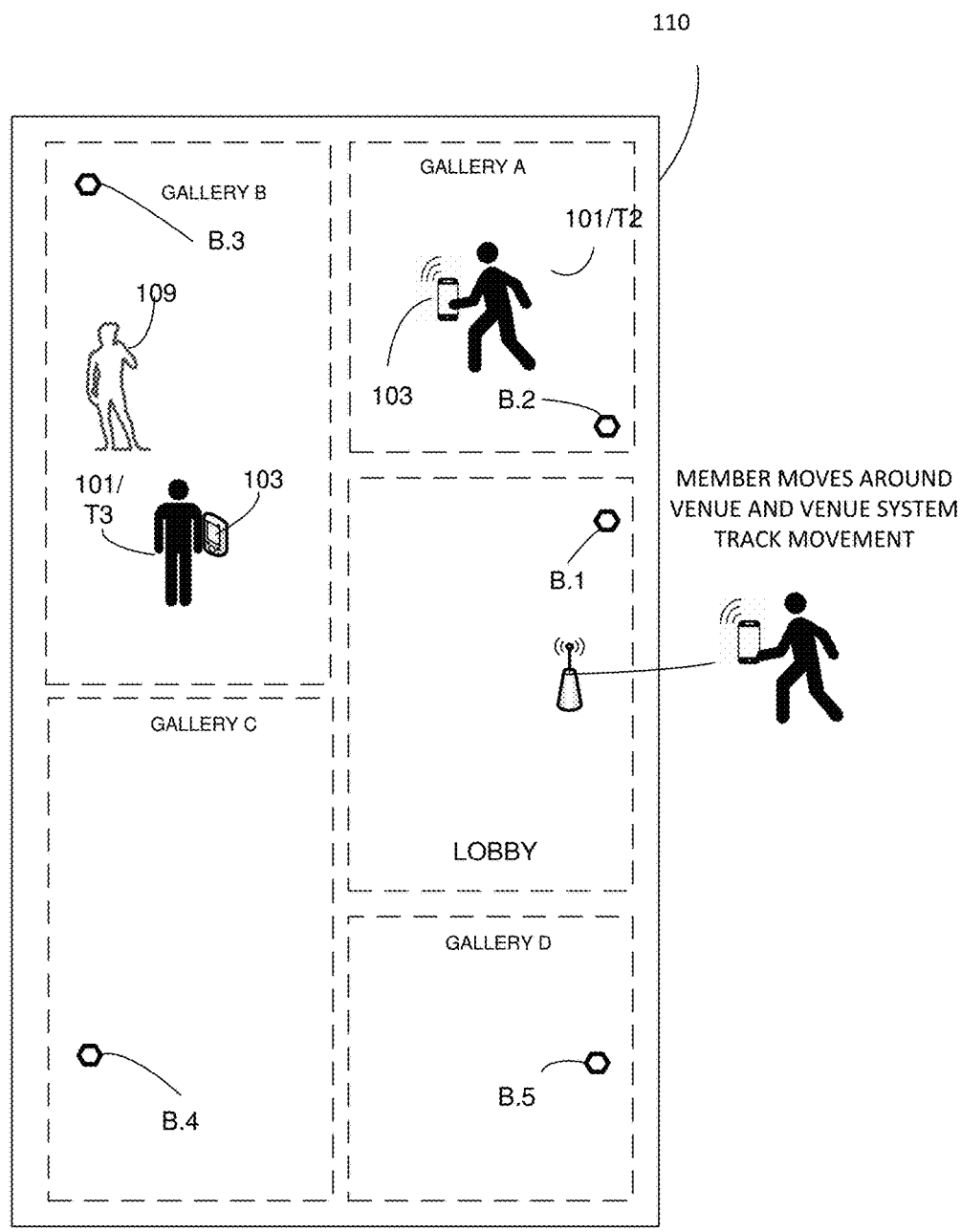
FIG. 3 is a diagram showing the member 101 entering and moving around the venue 110.

Referring to FIG. 3, which is a floor plan of a venue, such as the venue 110 shown in FIGS. 1 and 2, showing a lobby having the admission desk (not shown) and several galleries labeled Gallery A-D, and showing the member 101 moving around the venue from gallery to gallery. Each gallery in the venue has an admission system access point labeled AP.N, with N representing an integer number, that can operate to receive a message (referred to herein as an admission message) periodically transmitted by the member device 102 that comprises the encrypted identity or the member. Receiving this admission message from the device 102 allows the admission system 125 to track the movement of the member through the venue, and this movement information can be maintained and used by the venue for marketing or other purposes. Further, the dates and times of member admissions and movements can be tracked and maintained by the venue for similar purposes.

Figure 4A:
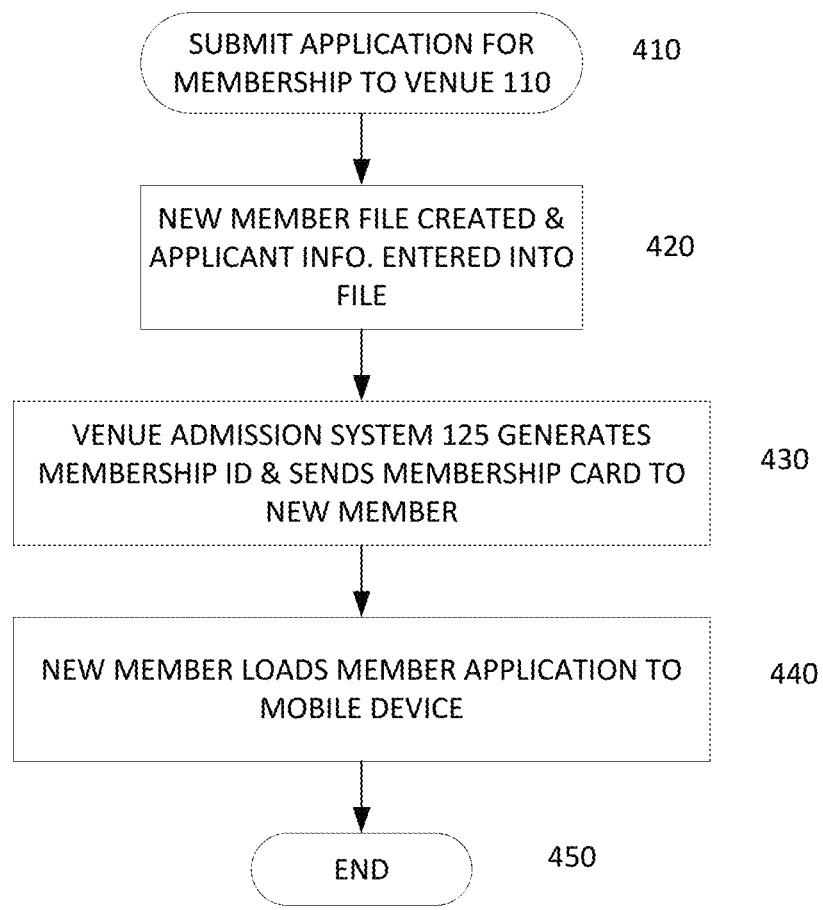
FIG. 4A is a flow diagram illustrating the steps performed during a membership registration process.

In order for the venue admission system 125 to verify membership information, it is first necessary for the system to receive certain membership information and to assign each new member a unique identity. The membership information can be received by the admission system pursuant to a membership registration process, and this process can be performed in-person at the venue, or on-line at the venue website. In either case, an application having membership information can be submitted to the venue. This membership information can be comprised of, among other things, the prospective members name, home address, contact information, and a requested membership level which is determined by a fee paid by the prospective member. FIG. 4 illustrates a process 400 that can be followed to register a new member with the venue admission system 125. At 410, a prospective new member enters information request by the venue 110 into a membership application form. This form can be maintained at the venue website and the new membership information can be entering electronically, or the form can be downloaded, printed and information entered manually. Regardless of how the new member information is entered into a membership form, the membership information is submitted to the venue admission system 125 which at 420 creates a new member file that is maintained in a membership information store described later with reference to FIG. 5. Then at 430. the system 125 generates a new member card having, among other things, a unique member identity. The member identity can be implemented on the card as a bar-code, a magnetic strip, or a chip, for example. The new member card can be mailed to the new member in the form of a physical card, or it can be transmitted to the new member electronically in the form of a virtual member card. The venue can notify the new member to download a mobile admission application to their mobile device for use later during an admission process.

Figure 4B:
FIG. 4B is a representation of a member card 460.

FIG. 4B illustrates the format that a new membership card can take, with the members name and membership identity shown as both a string of integer numbers and in the form of a bar-code, but the membership identity can take other forms and be implemented electronically in a different manner.

Figure 5:
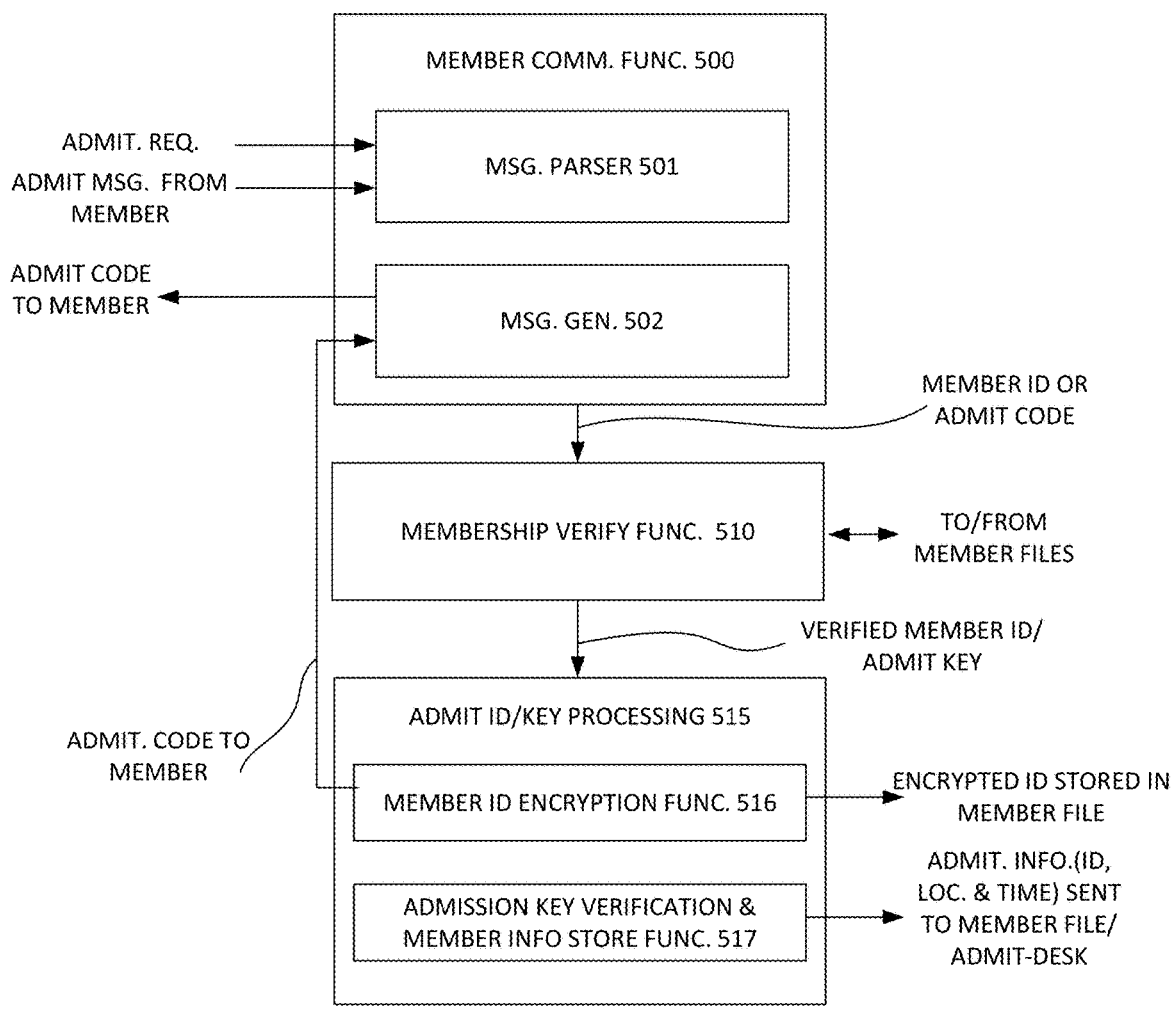
FIG. 5 is a diagram showing functionality comprising a venue admission system 125.

As previously described, the venue admission system 125 generally operates to receive member admission request messages having the member ID, to verify the member ID in the request, to encrypt the member ID to create a member admission code, and to send the admission code to a mobile admission application running on a member mobile device. Subsequently, the system operates to receive admission messages having the admission code from members approaching or entering a venue, to verify the admission code as having been assigned to a particular member, to store admission information in a member file and to send the member information to an admission desk for display as necessary. FIG. 5 illustrates functionality comprising the venue admission system 125 that can operate to perform the admission procedure described above. The venue admission system 125 has a member communication function 500 comprised of a message parser 501 and a message generator 502, a membership verification function 510, and an admission ID and admission code processing function 515, comprised of a function 516 to encrypt a member ID or some other member information, and an admission code verification and store function 517.

Continuing to refer to FIG. 5, the member communication function 500 operates to receive admission request messages and admission messages from a mobile admission application running on a mobile device under the control of a member. These admission request messages can include, among other things, an identity (member ID) assigned to a member by the admission system 125, and the request messages can be generated in the well-known SMS, MMS, or RCS formats, for transmission over a cellular network to the venue admission system 125 for delivery to the message parser 501 comprising communication function 500. The admission messages, also generated by the mobile admission application, are distinct from the admission request messages, and can include, among other things, an encrypted admission key or some other member information that is encrypted. As previously described, the admission code is an encrypted member ID, and this encryption can be accomplished by performing a hash of the member ID information. Upon the admission system 125 receiving either an admission request or admission message, logical computer instructions comprising the communication function 500 controls the message parser 501 to examine the messages for either a member ID or member code, and if either the ID or the code are detected, information comprising the ID or code is passed to the membership verify function 510. The verify function has logical computer instructions that operate on the ID or code to compare this information to membership information maintained in each a plurality of member files. If a match is detected in any one of the member files, then either the verified member ID or the verified admission code is passed the admit/code processing function 515, and the member ID can be encrypted or the admission code can be stored in the associated member file.

Continuing to refer to FIG. 5, if a member ID is detected in an admission request message by the parser 501, and if the member ID is verified by the function 510, then the member ID is encrypted, and the encrypted member ID is both stored in the member file and sent to the message generator 502 for inclusion in a member verification message that is generated and sent to the mobile admission application running on the member mobile device. Alternatively, if an admission message is received, and the admission code verification function 517 determines that the code is associated with a particular member, then the date and time of admission to the venue is stored in the member file and the member information can be sent to an admission desk for display.

FIG. 6 illustrates an example format of a member file maintained in the database 140 associate with the admission system 125. FIG. 6 has five individual member files having a first field that includes the name of each individual member, has a second field in which the membership ID information assigned at the time of registration is maintained, has a third field in which the number of memberships that have been paid for is maintained, has a fourth field in which a current hash of the member ID is maintained, and has a fifth field in which a universal unique identifier (UUID) is maintained. The UUID is comprised of the hashed member ID and two integers (zero's) at the end of the hash number (this to conform to a BLE packet format). The UUID represents the admission code that the admission system generates and sends in an identity verification message to the mobile admission application, and which the mobile admission application can then attach to an admission message sent to the admission system 125 when a member approaches or enters a venue.

Figure 7A:
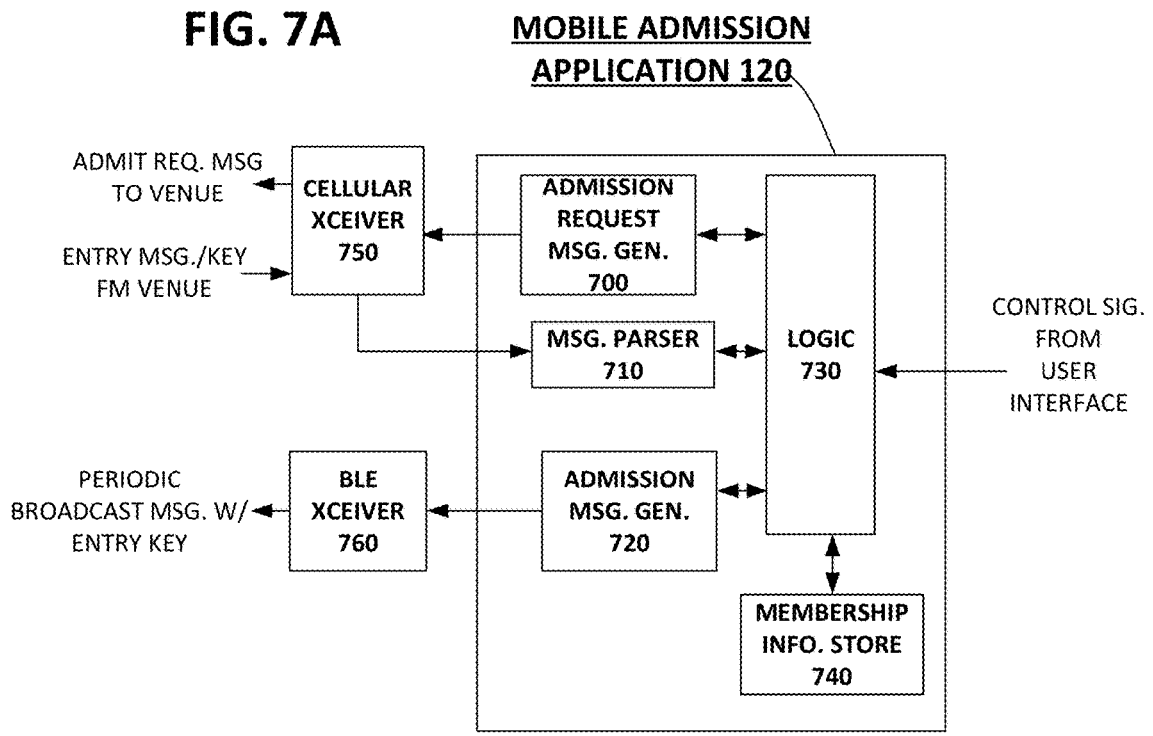
FIG. 7A shows functionality comprising one embodiment of a mobile admission application 120.

FIG. 7A is a block diagram illustrating functionality comprising one embodiment of a mobile admission application 120. This application can run on a mobile device, such as the device 102 described with reference to FIGS. 1 and 2, and is comprised of functionality that operates to maintain a member ID assigned during a registration process, maintain an admission code generated and sent to the application in an ID verification message by the venue admission system 125, and to generate admission request messages and admission messages, both of which can be sent to the venue admission system 125. The mobile application 120 has an admission request message generator 700, a message parser 710, an admission message generator 720, logic 730, and an associated store of membership information 740.

The mobile application 120 shown in FIG. 7A operates in conjunction with transceiver functionality 750 running on a mobile device, such as the device 102, to generate and send admission request messages to the venue admission system 125. It should be understood, however, that the member registration process described earlier should precede the application 120 generating an admission request message. The transceiver 750 can operate to send an admission request message to the venue admission system 125, and it can operate to receive messages from the venue admission system 125 over a wireless network (such as a cellular network). Messages received by the mobile application from the venue admission system 125 can be passed to the message parser 710, which can operate under control of the logic 730 to, among other things, examine the contents of the message to detect an admission code. If an admission code is detected, the logic can then cause the code to be placed into the store 740 for use later during admission. The transceiver 750 can operate using any wireless transmission technology that supports the transmission of admission request messages from a location this is not necessarily proximate to a venue. According to one embodiment, the transceiver 750 can be implemented in any suitable medium to long range wireless transmission technology, such as the well known WIFI, DECT or CDMA technologies.

Continuing to refer to FIG. 7A, the Bluetooth Low Energy (BLE) transceiver 760 can operate to send admission messages to the venue admission system 125. Admission messages can be generated by the message generator 720 under control of the logic 730, and a format for this admission message is illustrated with reference to FIG. 8. More specifically with reference to FIG. 7A, provided a member has been assigned a membership ID and received an admission code from the venue admission system 125, the logic 730 can examine the store of member information 740 for the admission code, and control the generator 720 place the admission code in to an admission message for transmission by the transceiver 760. The logic 730 is comprised of logical instructions maintained on any computer readable medium suitable for incorporation into a mobile communication device such as the device 102. The logic 730 can be initiated under control of the device 102 user to start the admission process. So, for example, when the user selects and opens the admission application 120, the application can display a number of options. One option can be an instruction to request admission to a venue. If the user selects this option, the logic 730 can move a copy of the member ID from the store 740 to the admission request message generator 700 which places the member ID into a packet format for transmission by the transceiver 750 to the venue admission system 125. Subsequently, the member mobile device 102 can receive a message from the admission system 125 having an admission code, and the logic 730 can control the parser 710 to examine the message for the admission code, and if the code is detected, move a copy of the code to the store 740 where it is maintained for later use. At some later time, the member can decide to enter and be admitted into the venue, they can then open the admission application 120 and select an option to be admitted to the venue. Selecting this option will cause the logic 730 to examine the store 740 for an admission code, and if the code is maintained in the store 740, the logic sends a copy of the code to the message generator 720 which places the code into a packet format (i.e., an admission message packet format) for transmission over the short-range transceiver 760 to the venue admission system 125. Alternatively, a geographic location application running on the mobile device 102 can determine that the mobile device is proximate to the venue, the mobile application can detect this proximity and automatically determine that the member is entering the venue and wants to gain admission, at which time the application can generate the admission message for transmission to the admission system 125 as above.

Figure 7B:
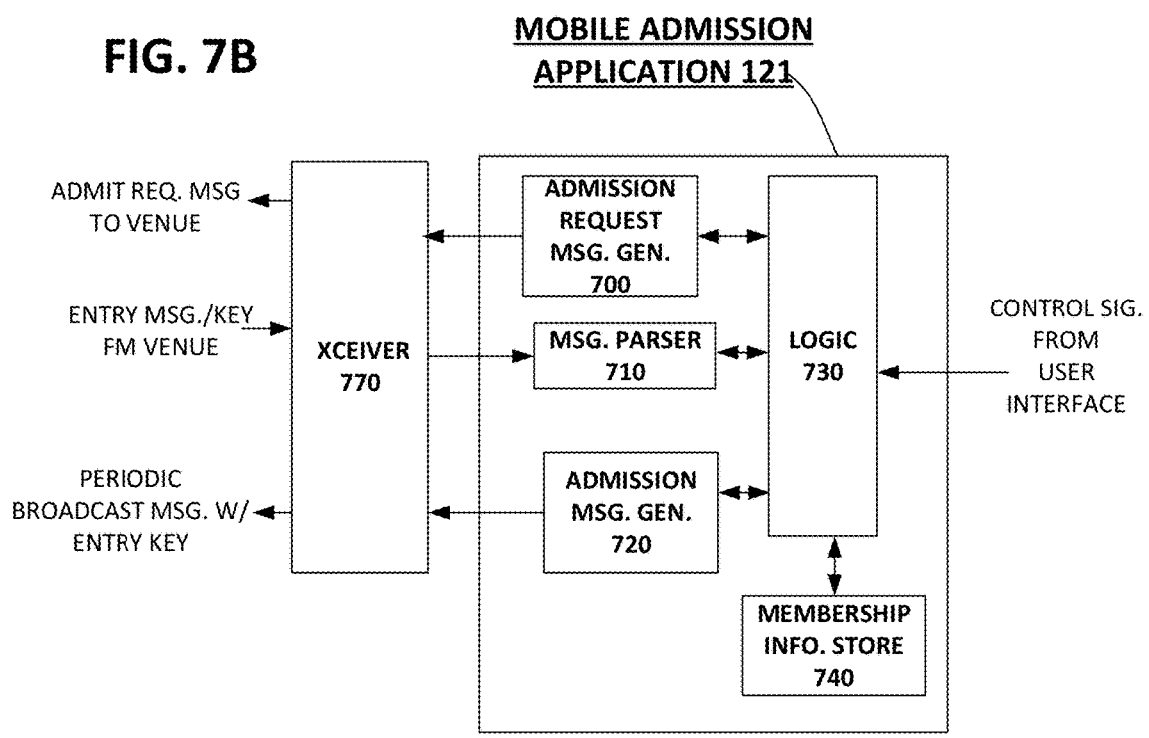
FIG. 7B shows functionality comprising another embodiment of a mobile admission application 121.

While FIG. 7A illustrates a mobile device 102 having two transceivers 750 and 760, in another embodiment a mobile admission application 121 can run on a mobile device having only one transceiver. FIG. 7B illustrates the embodiment in which the mobile device 102 has only a single transceiver labeled 770 that operates in conjunction with the mobile admission application 121. The functionality comprising the mobile admission application 121 in FIG. 7B is substantially the same as that comprising the mobile application 120 in FIG. 7A, and the operation of the application 121 to generate message sent to and to receive messages from the venue admission application is substantially the same as the application 120 in FIG. 7A. The transceiver 770 can be implemented in either long-range, medium-range or short-range wireless transmission technology, and the transmission technology used can depend on the environment in which the mobile application is intended to be used.

FIG. 9 illustrates a member admission process 900 that is comprised of the interaction between either of the mobile admission applications 120 or 121 and the venue admission system 125. It should be understood, that it is necessary that an individual complete a member registration process and be assigned a member ID by the admission system 125 prior to initiating the admission process. As previously described, once the registration process is complete and an individual is assigned an ID, at 910 the member can initiate the mobile admission application 120 and request admission to a venue. At 915 the admission request is sent to the venue admission system 125 with the assigned member ID information. Upon receiving the member ID information at 920, at 925 the venue admission system examines each of the member files looking for a member ID matching the ID in the request message. If the member is verified at 930, the venue admission system can encrypt the member identify information and send the encrypted ID information (encryption key) to the mobile admission application under control of the requesting member. At 940, the mobile admission application of the requesting member receives and stores the admission key for use later in an admission message. At a point in time that that member desires to enter a venue, the mobile application can be controlled at 945 to periodically generate and send an admission message having the encryption key received from the venue admission system. At 950, when the venue admission system receives an admission message, the membership status of the individual whose mobile admission application transmitted the message is verified and admission information is recorded in the member file and membership information can be sent to an admission desk for display on a monitor. The member mobile admission application can continue to periodically transmit admission messages as the member moves around from place-to-place in the venue, and wireless access points connected to the venue admission system 125 can receive these periodic admission message and the message having the admission key to the admission system. In this manner, the movements of the member can be tracked as they move around the venue.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method for securely verifying the identity of an individual for admission to a venue, comprising:
   assigning a unique member ID to the individual by a venue admission system, and the member ID is maintained in association with an admission application running on a mobile communication device;
   controlling the admission application to generate and wirelessly transmit a venue admission request message having the member ID;
   the venue admission system receiving the venue admission request message and using the member ID to identify one of a plurality of member files that corresponds to the individual to verify that the individual is a registered member of the venue;
   encrypting at least some information in the member file corresponding to the individual registered with the venue and including the encrypted information as an admission code in a membership verification message that the venue admission system wirelessly transmits to the mobile communication device;
   the mobile admission application receiving the membership verification message and generating an admission message, having the admission code information, that is periodically broadcast by the mobile communication device; and
   the venue admission system receiving the periodically broadcast admission message, and using the admission code information to verify that the individual entering the venue is a member and to confirm pre-payment by the individual of an admission fee.

2. The method of claim 1, further comprising the mobile admission application continuing to periodically broadcast the admission message subsequent to the venue admission system verifying that the individual is a venue member and using information in the periodically broadcast admission message to track the movement of the individual while they are in the venue.

3. The method of claim 1, wherein the unique identity assigned to the individual is maintained in a store associated with the venue admission system.

4. The method of claim 1, wherein the venue admission request and membership verification messages are respectively transmitted by the mobile communication device and the venue admission system by transceivers supporting a long-range wireless technology.

5. The method of claim 1, wherein the admission message is transmitted by the mobile communication device by a transceiver supporting a short-range wireless technology.

6. The method of claim 5, wherein the short-range wireless technology is any one of a low-energy BlueTooth, a WIFI or a DECT technology.

7. The method of claim 1, wherein the at least some of the information in the member file is encrypted by performing a hash on the unique identity information.

8. The method of claim 1, further comprising the venue admission system sending membership information comprising the member file corresponding to the individual to a venue admission desk for display coincident with the individual entering the venue.

9. A method for securely verifying the identity of an individual for admission to a venue, comprising:
  a venue admission system receiving a wireless venue admission request message from an admission application running on a mobile communication device, the wireless venue admission request message having information that uniquely identifies the individual and which is assigned to the individual by the venue admission system;
  using the unique identification information in the wireless venue admission request message to identify one of a plurality of member files that corresponds to the individual to verify that the individual is a registered venue member, encrypting at least some information in the member file, and including the encrypted information as an admission code in a membership verification message that is wirelessly transmitted to the admission application running on the mobile communication device; and
  the venue admission system receiving an admission message, having the admission code, that is periodically broadcast by the admission application, and using the admission code information to verify that the individual is a venue member.

10. The method of claim 9, further comprising the venue admission system continuing to receive a periodically broadcast third message subsequent to verifying the membership of the individual, and using information in the periodically broadcast third message to track the movement of the individual while they are in the venue.

11. The method of claim 9, wherein the unique identity assigned to the individual is maintained in membership file associated with the venue admission system.

12. The method of claim 9, wherein the at least some of the information in the member file is encrypted by performing a hash on the unique identity information.

13. The method of claim 9, further comprising the venue admission system sending membership information comprising the member file corresponding to the individual to a venue admission desk for display coincident with the individual entering the venue.

14. A system for securely verifying the identity of an individual for admission to a venue, comprising:
  a mobile communication device running an admission application; and
  a venue admission system comprising at least one computational device with associated computer file storage;
  wherein:
    the admission application operates under control of the individual to generate and wirelessly transmit a venue admission request message to the venue admission system having information that uniquely identifies the individual and which is assigned to the individual by the venue admission system;
    the venue admission system operates to receive the venue admission request message, use the unique identification information to verify that the individual is a registered member of the venue, to encrypt at least some information in a member file corresponding to the individual registered with the venue, and include the encrypted information in a membership verification message that is wirelessly transmitted to the mobile communication device;
    the mobile communication device operates to receive the membership verification message and the mobile admission application running on the mobile communication device generates an admission message having the encrypted information, and periodically broadcasting the admission message; and
    the venue admission system operates to receive the periodically broadcast admission message and uses the encrypted information to verify that the individual is a venue member.

15. The method of claim 14, further comprising the mobile admission application continuing to periodically broadcast the admission message subsequent to the venue admission system verifying that the individual is a venue member, and using information in the periodically broadcast admission message to track the movement of the individual while they are in the venue.

16. The method of claim 14, wherein the membership of the individual in the venue is verified by the venue admission system comparing the unique identity information in the first message to information comprising each one of a plurality of membership files maintained in the store associated with the venue admission system.

17. The method of claim 14, further comprising the venue admission system sending membership information comprising the member file corresponding to the individual to a venue admission desk for display coincident with the individual entering the venue.

* * * * *